US005898780A

United States Patent [19]

Liu et al.

[11] Patent Number: 5,898,780
[45] Date of Patent: Apr. 27, 1999

[54] METHOD AND APPARATUS FOR AUTHORIZING REMOTE INTERNET ACCESS

[75] Inventors: Lynn Y. Liu, Cupertino; Juan Lu, San Mateo; Tao Wang, Fremont, all of Calif.

[73] Assignee: GRIC Communications, Inc., Milpitas, Calif.

[21] Appl. No.: 08/727,996

[22] Filed: Oct. 9, 1996

Related U.S. Application Data

[60] Provisional application No. 60/017,682, May 21, 1996.
[51] Int. Cl.$^6$ .................................................. H04L 9/00
[52] U.S. Cl. ............................................. 380/25; 705/18
[58] Field of Search ................................ 380/25, 23, 30; 370/200; 379/88.17; 705/18; 707/10

[56] References Cited

U.S. PATENT DOCUMENTS

| | | | |
|---|---|---|---|
| 4,922,486 | 5/1990 | Lidinsky et al. | 370/60 |
| 5,416,842 | 5/1995 | Aziz | 380/30 |
| 5,623,601 | 4/1997 | Vu | 395/187.01 |
| 5,696,901 | 12/1997 | Konrad | 395/200.09 |

OTHER PUBLICATIONS iPass Inc.–True Global Internet Roaming, *web page*, http://www.ipass.com (Sep. 14, 1998) p. 1.
iPass Services–Service Overview (Whitepaper), web page, http//www.ipass.com/services/isp–whitepaper.html (Oct. 28, 1998) pp. 1–12.
iPass Services–Become a Global Provider Today, web page, http://www.ipass.com/services/isp.html (Oct. 28, 1998) pp. 1–3.
Your Guide to Global Internet Roaming, Marketing Brochure, 1997.
iPass Inc.—True Global Internet Roaming, *web page*, http://www.ipass.com/ (1997).
Rigney, C. et al., *Remote Authentication Dial In User Service–draft application*, ftp://ftp.livingston.com/pub/ra...draft–ietf–radius–radius–02.txt (Feb. 1996) pp. 1–57.

*Primary Examiner*—Salvatore Cangialosi
*Attorney, Agent, or Firm*—Hopkins & Carley; Donald J. Pagel

[57] ABSTRACT

A method and apparatus for allowing a user to access the internet from a remote location by using a local internet service provider with whom the user does not have an account. The user logs on to the local internet service provider's system using an identifier that includes the user's identification term and an identifier for the user's home internet service provider server. A first server in the local internet service provider's system determines that the login information includes the identifier for the user's home internet service provider server and sends a query to a second server. The second server verifies that the user's home internet service provider has an account with the local internet service provider and returns an internet protocol address for the home internet service provider's server to the first server. The first server then seeks authorization from the home internet service provider's server to provide internet access to the user over the local internet service provider's system.

18 Claims, 5 Drawing Sheets

METHOD AND APPARATUS FOR AUTHORIZING REMOTE INTERNET ACCESS

This application claims priority of provisional patent application 60/017,682, filed May 21, 1996.

BRIEF SUMMARY OF THE INVENTION

The present invention comprises a method and apparatus for allowing a user to access the internet from a remote location by using the local network of a local internet service provider. For purposes of this patent application, a local (also called foreign) internet service provider is an internet service provider with whom the user does not have an account. The internet service provider (ISP) with whom the user does have an account is referred to as the home internet service provider (home ISP). The apparatus of the present invention comprises a server or servers that can recognize the domain name of the home ISP in the login information provided by the user. The server or servers can also verify that the domain name of the home ISP is listed with the local ISP and can retreive an internet protocol (IP) address and related information for the server having the domain name of the home ISP.

In the method of the present invention, the user logs on to the local network of the foreign internet service provider using an identifier that includes the user's identification term, an identification term for the server of the home ISP, such as the domain name of the user's home ISP server, and usually, a secret password. For example, the user might log on to the local network of the local ISP by using a standard e-mail address such as jdoe@aimnet.com, followed by the user's secret password. This contrasts with the currently used practice where a user does not need to use an identifier for the home ISP because it is assumed that the user is dialing into her own home ISP's system. For example, in the currently utilized practice the user would log on using jdoe and probably a secret password.

In an embodiment of the present invention referred to as a peer-to-peer system, a specially modified authentication server in the local internet service provider's system detects that the login information includes the identification term for the server of the home ISP. The server then verifies that the user's home internet service provider has an account with the local internet service provider and then seeks authorization from the home internet service provider server to provide internet access to the user.

In another embodiment of the present invention, referred to as a centralized roaming system, after the authentication server determines if the user's log in information includes the identification term for the server of the home ISP, a routing server is used to verify that the user's home internet service provider has an account with the local internet service provider and to retrieve an IP address and related information for the server of the home ISP. This information is then sent back to the authentication server of the local ISP which seeks authorization from the home ISP server to provide internet access to the user. A plurality of authentication servers from a plurality of local ISP's can utilize a single routing server. This provides the advantage that only the routing server needs to be updated with revised information about one or more home ISP's.

In another embodiment of the present invention, referred to as a distributed roaming system, if the first routing server cannot verify that the user's home internet service provider has an account with the local internet service provider, then the query is passed on to a second routing server that contains a different listing of home ISP's . This allows the first routing server to act as a "gateway" to other networks having additional client servers.

BRIEF DESCRIPTION OF THE DRAWINGS

FIG. 2 is a block diagram of the software loaded on the remote user authentication server according to the present invention;

DETAILED DESCRIPTION OF THE PREFERRED EMBODIMENT

Figure 1:
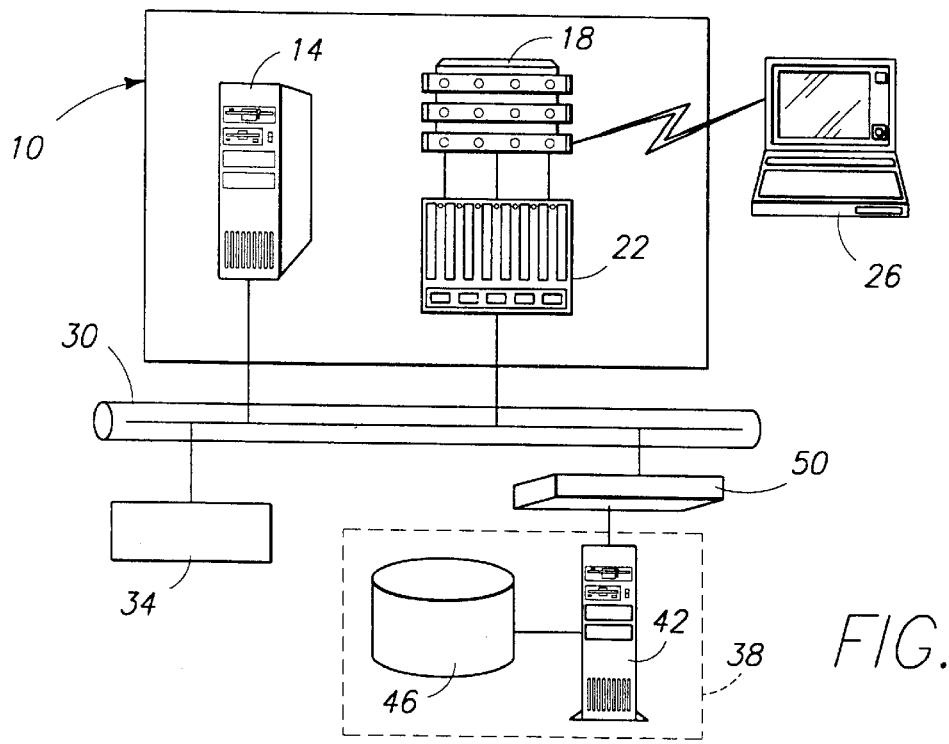
FIG. 1 is a schematic view of a system that utilizes a remote user authentication server according to the present invention.

FIG. 1 is a schematic diagram of a remote user network access system 10 comprised of a remote user authentication server 14, a modem rack 18, a communication server 22, and a remote computer 26. A remote computer 26 is connected to the modem rack 18 by a standard telephone link. The modem rack 18 is connected to the communication server 22 which is connected to the remote user authentication server 14 by an internet protocol (IP) addressable network 30, such as a local area network (LAN) or a wide area network (WAN). A router 34 is also connected to the network 30 for routing communications to other IP addressable networks. The router 34 is a commercially available hardware system and provides a connection between the network 30 and the internet. In this application, the term internet refers to the global information network.

An optional customer billing module 38 can be connected to the network 30 for collecting user information for billing purposes. The billing module 38 comprises a server 42 and a customer database 46. Typically, the module 38 is protected by a firewall 50 so as to inhibit unauthorized access to the billing module 38

The remote computer 26 can be any type of computer equipped with a modem, such as a standard laptop computer. The modem rack 18 includes a plurality of modems so that a plurality of remote computers 26 can access the system 10. The communication server 22 is a standard communication server that functions to connect the remote computer 26 to the network 30.

The remote user authentication server 14 comprises a commercially available user authentication server that has been modified with novel software to perform the functions illustrated in FIG. 2. Commercially available servers that are suitable for this purpose include Radius type servers originally developed by Livingston Enterprises(Radius is an acronym for Remote Authentication Dial In User Service). Similarly, a TACACS+ protocol and a TACACS+ protocol server can also be used as the server 14 (TACACS+ is a general purpose customer authentication protocol available from Cisco Systems Inc.).

FIG. 2 illustrates that the server 14 includes a plurality of software modules such as a user recognition module 54, a host table module 58 and a connection time log 62. The host table module 58 is a listing by domain name of internet service providers who have an account with the local internet service provider. The connection time log module 62 is a module that keeps track of the time a user is logged onto the internet, typically for billing purposes, by recording log in and log out information. The user recognition module 54 is discussed in more detail with respect to FIG. 4 below.

Figure 3:
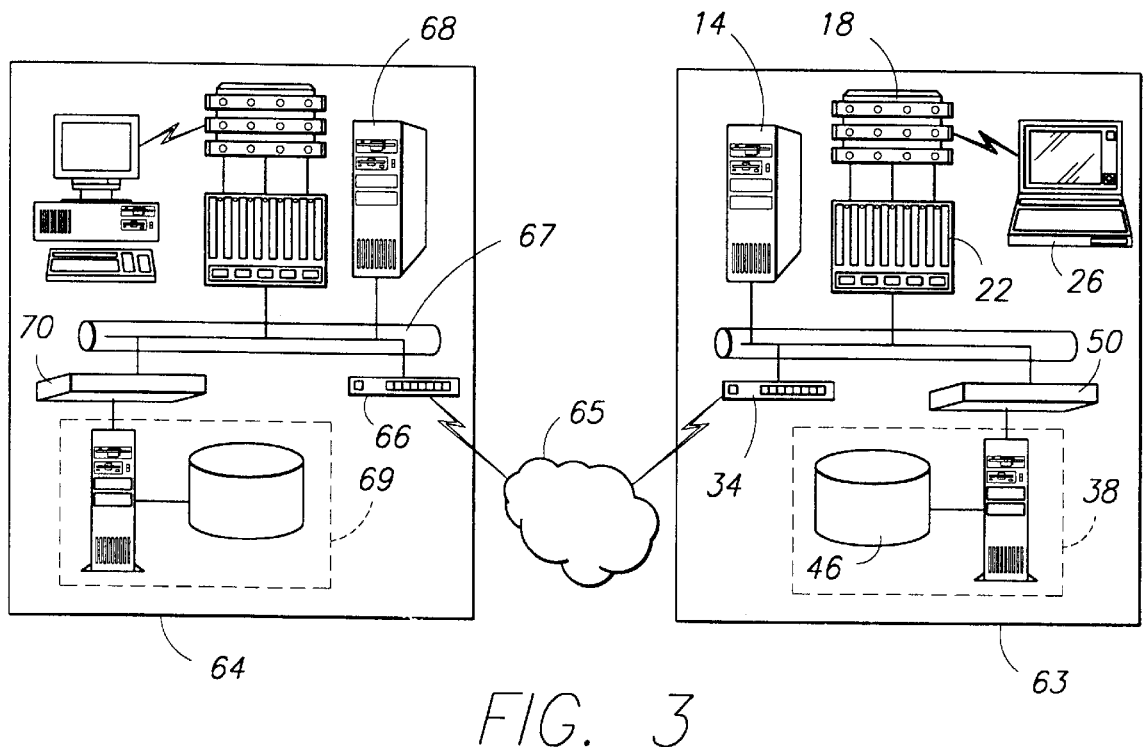
FIG. 3 is a schematic view of a remote user authentication server connected to a home internet service provider server via the internet.

FIG. 3 illustrates a connection between a local system 63 (i.e. the local network of a local internet service provider) and a home internet service provider system 64 via an internet connection 65. A router 66 transfers information sent by the router 34 from the internet connection 65 to a home network 67, such as a LAN or WAN. A user authentication server 68 and an optional billing system 69 are connected to the network 67. Typically, a firewall 70 protects the billing system 69 from unauthorized access. The system 63 and 64 illustrate a peer-to-peer system because the authentication server 14 knows the IP address of the server 68 without having to retrieve it from another server.

Figure 4:
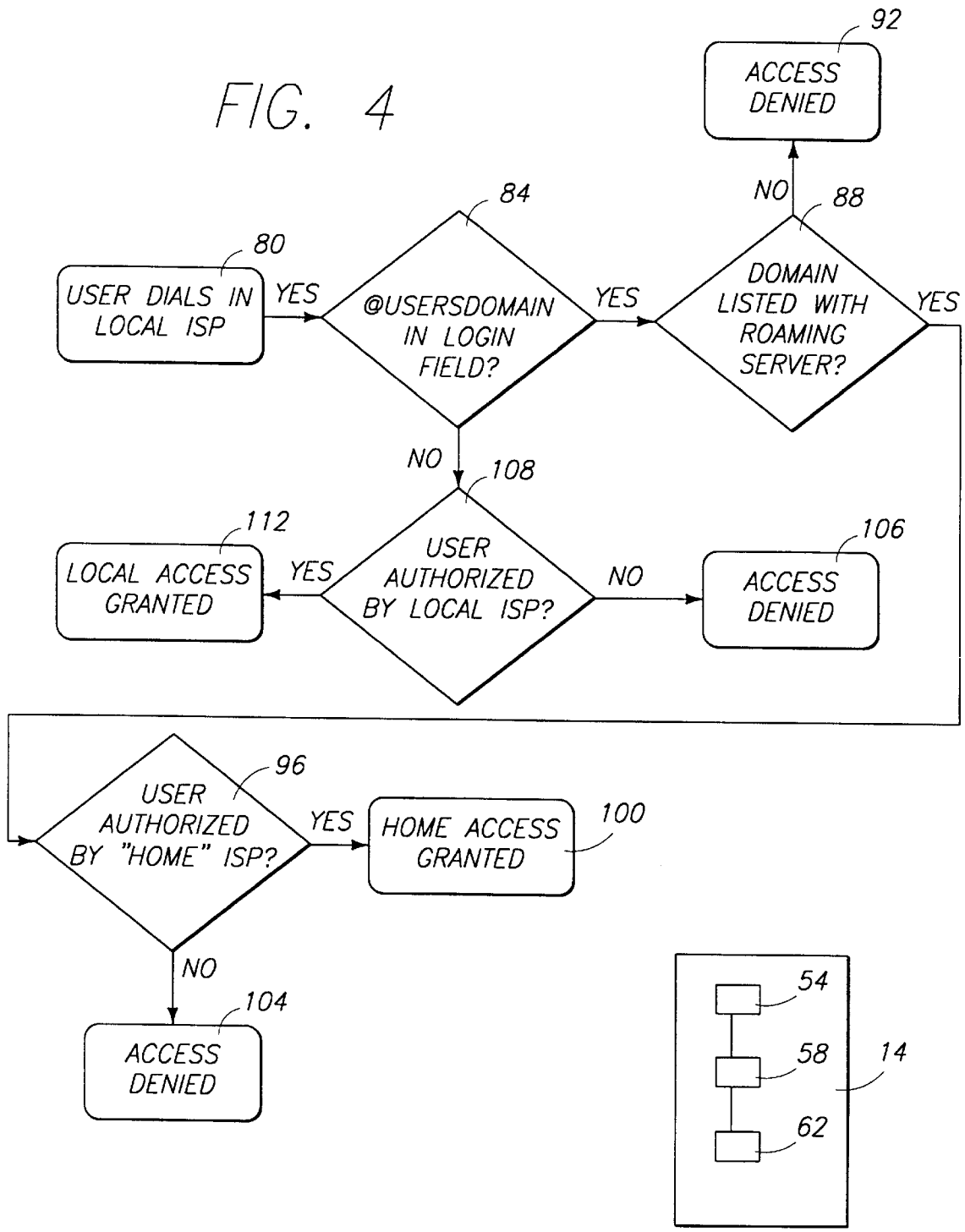
FIG. 4 is a flow chart illustrating the method used to provide remote user access to the internet according to the present invention.

FIG. 4 illustrates the functions performed by the user recognition module 54. In block 80, a user has used the remote computer 26 to connect to the modem rack 18 of a local internet service provider. In the method of the present invention a user who is not a customer of the local internet service provider logs in using the following format: a user identifier plus a home ISP identifier plus a password. For example, an acceptable login format might be of the form username@userdomain, where the term userdomain is the domain name of the user's home internet service provider, and the term user name is the user identification used with the user's home internet service provider. For example, the login could be jdoe@aimnet.com, which is a typical e-mail address. Normally a password will also be used in the login process.

In block 84, the user recognition module 54 looks to see if the home ISP identifier, for example the term @userdomain, is in the login field. If it is, then in block 88, the home ISP identifier is checked against the host table 58 (shown in FIG. 2) to verify that the home ISP identifier (i.e. the user's home internet service provider) is registered with the local internet service provider. Block 92 illustrates that access to the internet is denied if the home ISP identifier is not listed in the host table 58. If the home ISP identifier is listed in the host table 58, the server 14 routes the username (and password) to the home internet service provider system 64 via the router 34, the internet link 65 and the router 66. In block 96, the user authentication server 68 then verifies that the user is a customer of the home internet service provider (e.g. has an account and is in good standing). If the server 68 decides that the user is a customer of the home internet service provider, then in block 100, the server 68 sends an authorization message back to the local internet service provider system 63, via the internet connection 65. Alternatively, the server 68 can deny authorization as indicated at block 104.

In block 84, if an identifier for the home ISP is not present, then the server 14 checks to see if the user is a customer of the local ISP, and hence is authorized to use the system 63 at block 112.

Figure 5:
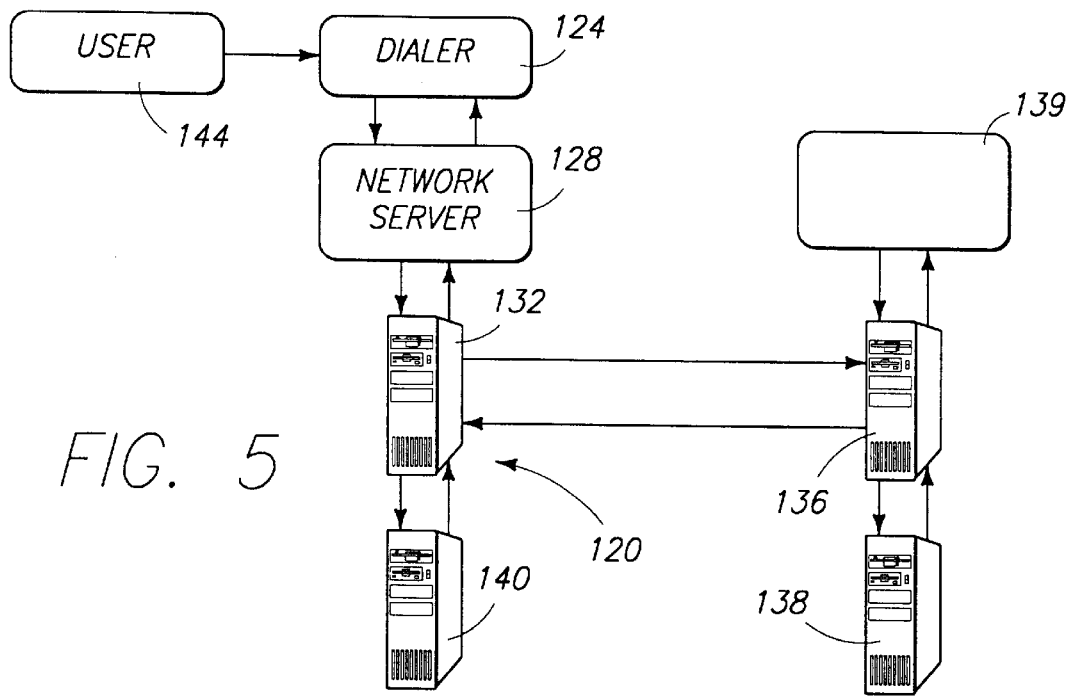
FIG. 5 is a schematic view of a system that utilizes a remote authentication server and a routing server according to the present invention.

FIG. 5 illustrates an embodiment of the present invention referred to as a centralized remote internet access system 120. The system 120 includes a dialer 124, a local network access server 128, a local authentication server 132, a first routing server 136, a second routing server 138 and a home authentication server 140. The second routing server 138 is an optional component as is discussed below. Additionally, the server 136 includes a link to a domain name server 139. The domain name server 139 is a distributed database that provides the mapping between IP addresses and hostnames.

The dialer 124 comprises commercially available communications software running on a first computer to be connected to a second computer via a modem connection. For example, communications software available in software programs such as Windows 95™, Netscape Navigator™ or Chameleon™ can function as the dialer 124. A user 144 is a person operating the computer on which the dialer software 124 is running.

Most of the components in the system 120 are analogous to components described previously with respect to FIGS. 1–3. The dialer 124 connects to the network server 128 through a modem rack, such as the modem rack 18 shown in FIG. 1. The server 128 is identical to the communication server 22 described previously with respect to FIG. 1, and is commercially available from sources such as Cisco Systems Inc. (Cisco 2500™) and Ascend Communications (Ascend Max 4000™). The server 132 is analogous to the server 14, but includes additional software described below. The server 140 is identical to the server 68. The hardware components of the servers 132, 136 and 140 are commercially available from sources such as Sun, DEC and Cisco Systems Inc.

Figure 6:
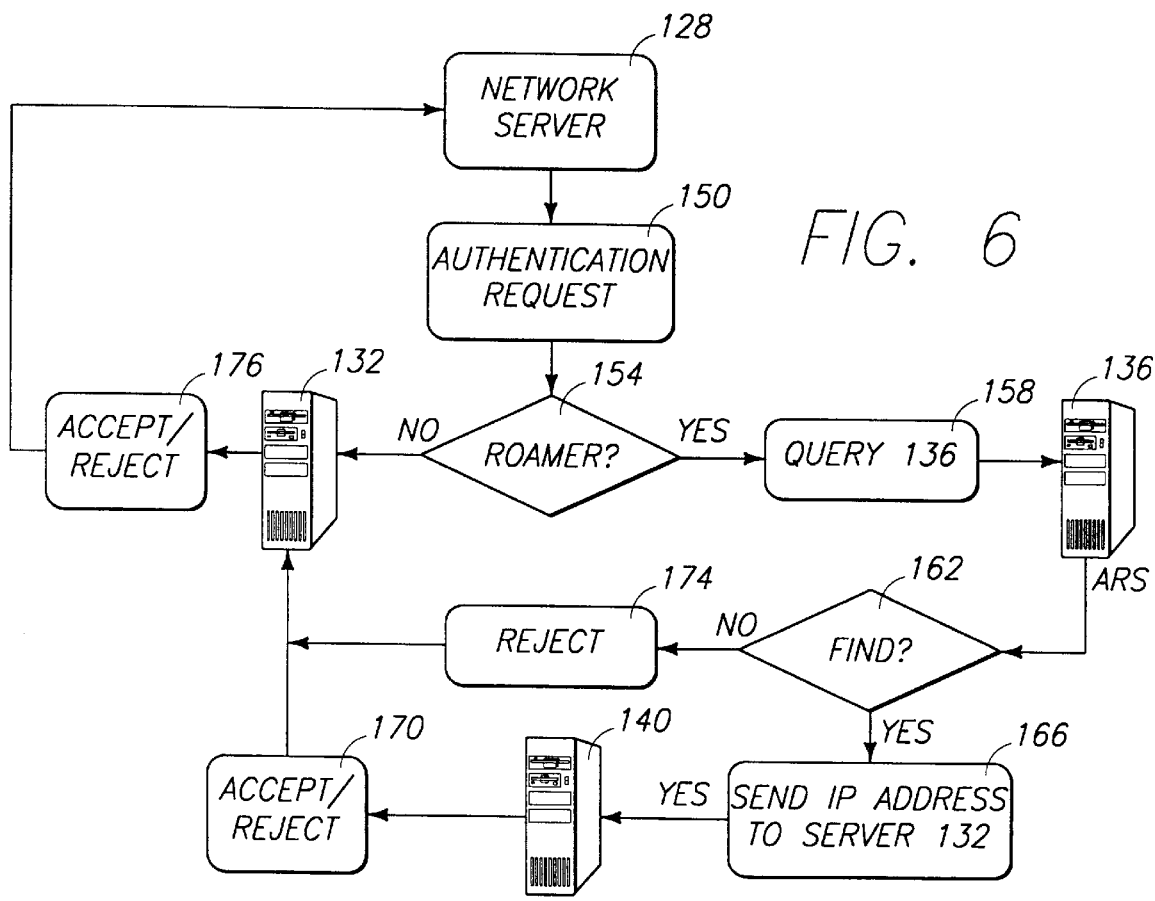
FIG. 6 is a flow chart illustrating the method used by the routing server to verify that a home ISP is available for authenticating user information.

Comparing FIG. 5 to FIG. 3 illustrates that the system 120 includes the routing servers 136 and 138 which are not present in the system shown in FIG. 3. FIG. 6 illustrates the way the server 136 functions in the system 120. The user 144 connects to the system 120 via the dialer 124 and transmits login information as was described previously with respect to FIG. 4. At block 150, the network server 128 issues a request to authenticate the login information. At block 154, the server 132 determines whether or not the login information contains a "roaming" designation such as the @ character followed by additional user information. If roaming information is detected, the server 132 queries the login information to the routing server 136 as indicated by block 158.

Block 162 indicates that the server 136 includes software that attempts to match the "roaming" login information with an entry in a log table in the server 136. If the server 136 can make a match, then at block 166 the server 136 returns information to the server 132 that includes an IP address for a server that has the domain name contained in the login information provided by the user 144. The server 132 then sends an authentication request containing the user's name and password to the server 140. The server 140 checks this information and at block 170, transmits a message to the server 132 either stating that the user 144 should be granted or denied internet access.

Block 174 indicates that if the server 136 cannot match the "roaming" login information, then a message is sent to the server 132 stating that internet access should be denied to the user 144.

In another situation, if no roaming information was detected at block 154, then at block 176, the server 132 processes the login information to determine if the user is a customer of the local ISP. The decision to accept or reject the user is then based solely on the user authentication information maintained by the local ISP.

Figure 7:
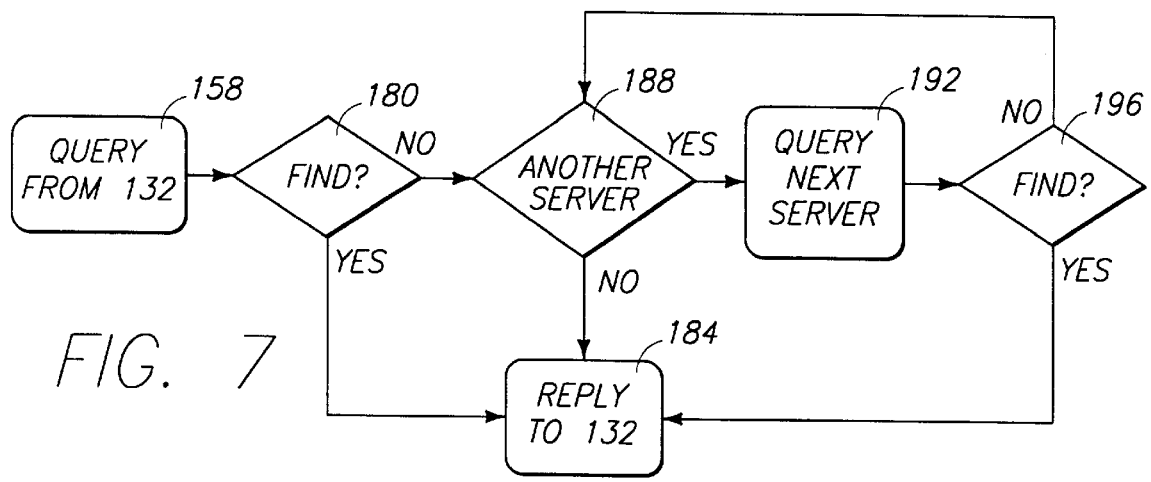
FIG. 7 is a flow chart illustrating the method used by a first routing server to forward a query to another routing server.

FIG. 7 illustrates the general flow of the searching function performed by the routing server 136. Beginning with block 158 (also shown in FIG. 6), a query is sent to the server 136 by the server 132. Typically, if the login information for the user 144 is in the form of username@userdomain plus password, the username and password are stripped away so that the query only asks the server 136 if it can verify the userdomain information and provide an internet address for the server identified by the userdomain term. The server 136 checks its authentication table. At block 184, if the server 136 finds a match with the userdomain transmitted in the query, the server 136 returns an internet protocol (IP) address for the userdomain to the server 132, along with other information such as the port number, authentication type and time zone difference. In the preferred embodiment, RADIUS type authentication is used. But other authentication types, such as TACACS+ could be used.

At block 188, if the server 136 cannot identify the userdomain, the server 136 checks if another routing server is available to process the query. If another routing server is available, such as the server 138, the server 136 can route the query to the second routing server 138. If another routing server is not available, then at block 188, the server 136 replies to the server 132 that identification could not be made.

The second routing server 138 attempts to identify the userdomain in the same manner that the server 136 functioned. At block 196, if the server 138 finds a match with the userdomain transmitted in the query, the server 138 returns an internet protocol (IP) address for the userdomain to the server 132, along with other information such as the port number, authentication type and time zone difference. If no match is made at block 196, the server 138 sends a message back to the server 136 that another routing server should be queried, if any remain to be queried.

Figure 8:
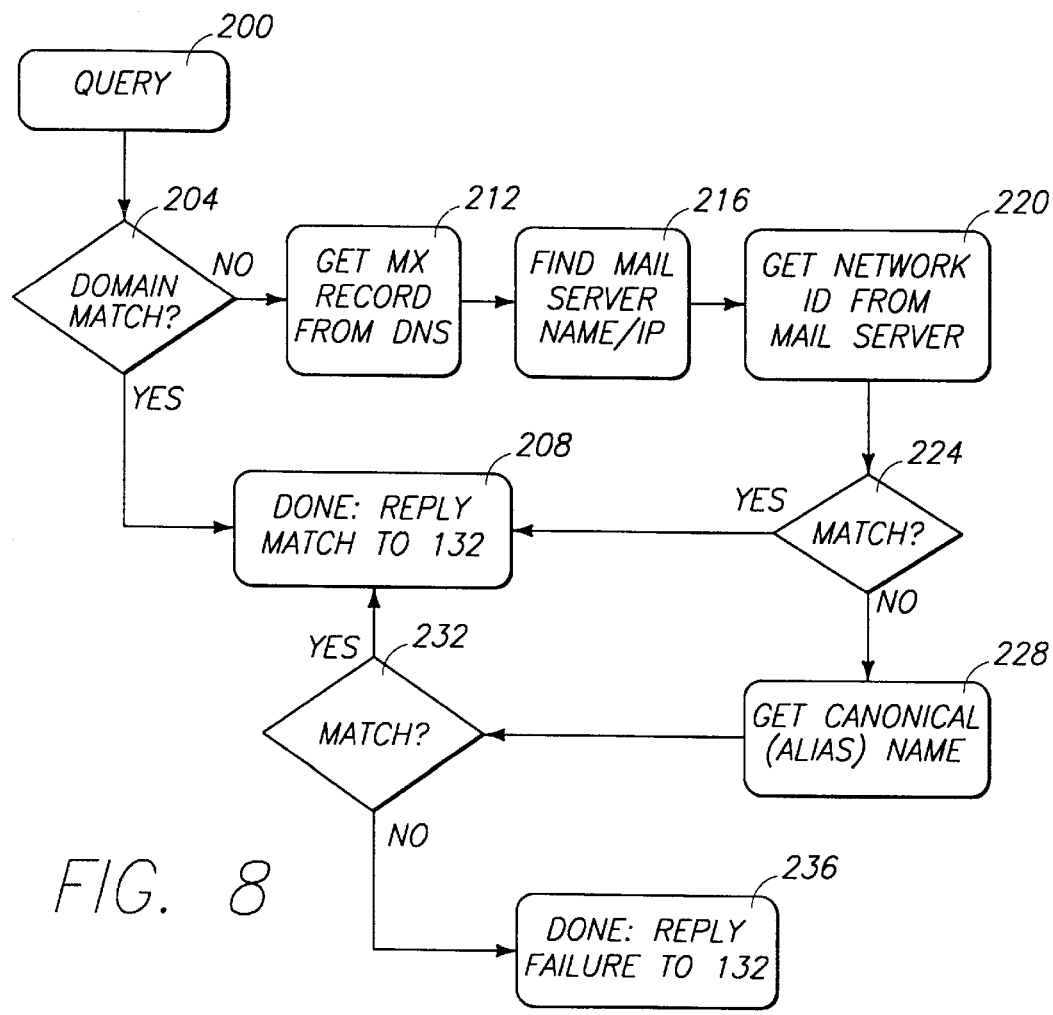
FIG. 8 is a flow chart illustrating the method used by the routing server to obtain an internet protocol address for problematic queries.

FIG. 8 illustrates the search process utilized by the routing servers 136 and 138 in attempting to identify the userdomain information. At block 200, the server 136 receives a query from the server 132. (Alternatively, block 200 can represent the starting point where the a subsequent routing server, such as the server 138, receives a query from a previous routing server.) As explained previously, in the query, the username and password are stripped away so that the query only asks the server 136 if it can identify the userdomain information and provide an internet address for this userdomain.

At block 204, the server 136 attempts to match the userdomain information (i.e. the domain name entered by the user 144) with a list of domain names or network identification data for the server 140 which is stored as an authentication table in the server 136. The match attempt is made by initiating a reverse comparison in which the last character in the domain name is compared to the last character of an entry in the authentication table. For example, for the domain name aimnet.com, the search begins with the letter "m" and continues until a match for "moc.tenmia" is found in the authentication table. At block 208, if a match is made between userdomain information and an entry in the authentication table, then the server 136 sends the internet address of the home ISP server (i.e. the server 140) to the server 132, along with other information, such as the port number and type for the server 140.

Typically, the internet address is sent to the server 132 as a 32-bit number (in hexidecimal form). Typically, internet addresses are assigned by InterNIC in dotted-decimal notation of the form 127.255.255.255. Since these numbers are hard to remember, a word form, called the domain name, is associated with the number. An example of a domain name is aimnet.com. The dotted decimal notation is converted into a 32-bit hexidecimal form to yield a true IP address. Typically, only some of the groups of characters in the dotted-decimal notation are assigned to a requester by InterNIC. The remainder of the characters are selected by the requester to identify machines on the requester's network. The group of characters assigned by InterNIC uniquely identifies a server and is referred to as the "network ID." Both domain names and network ID's can be listed in the authentication table.

At block 212, if the server 136 could not match the userdomain information with an entry in the authentication table, then the server 136 sends a query to the domain name server 139 requesting the mail exchange (MX) address for the userdomain contained in the query received from block 200. At block 216, the MX address is used to find the userdomain's mail server IP address. At block 220, the server 136 uses the mail server IP address to find the network ID for the relevant userdomain. At block 224, the server 136 compares the network id obtained in block 220 with the network ID stored in the authentication table of the server 136. If the comparison in block 224 results in a match, then at block 208, the server 136 sends the internet address and other information about the home ISP server for the userdomain that was matched, to the server 132, as was described previously.

If no match is made at block 224, then at block 228, the server 136 asks the domain name server 139 if the userdomain information is a canonical name (i.e. an alias). At block 232, the server 136 compares the network ID obtained by the canonical name search (from the domain name server 139) obtained in block 228 with the network ID stored in the authentication table of the server 136. If the comparison in block 232 results in a match, then at block 208, the server 136 sends the internet address and other information about the home ISP server for the userdomain that was matched, to the server 132, as was described previously. If the comparison in block 232 does not result in a match, then at block 236, the server 136 sends a failure message to the server 132. The server 132 sends a message to the server 128 that the user 144 is not authorized to use the system 120. The server 128 then denies internet access to the user 144.

Figure 9:
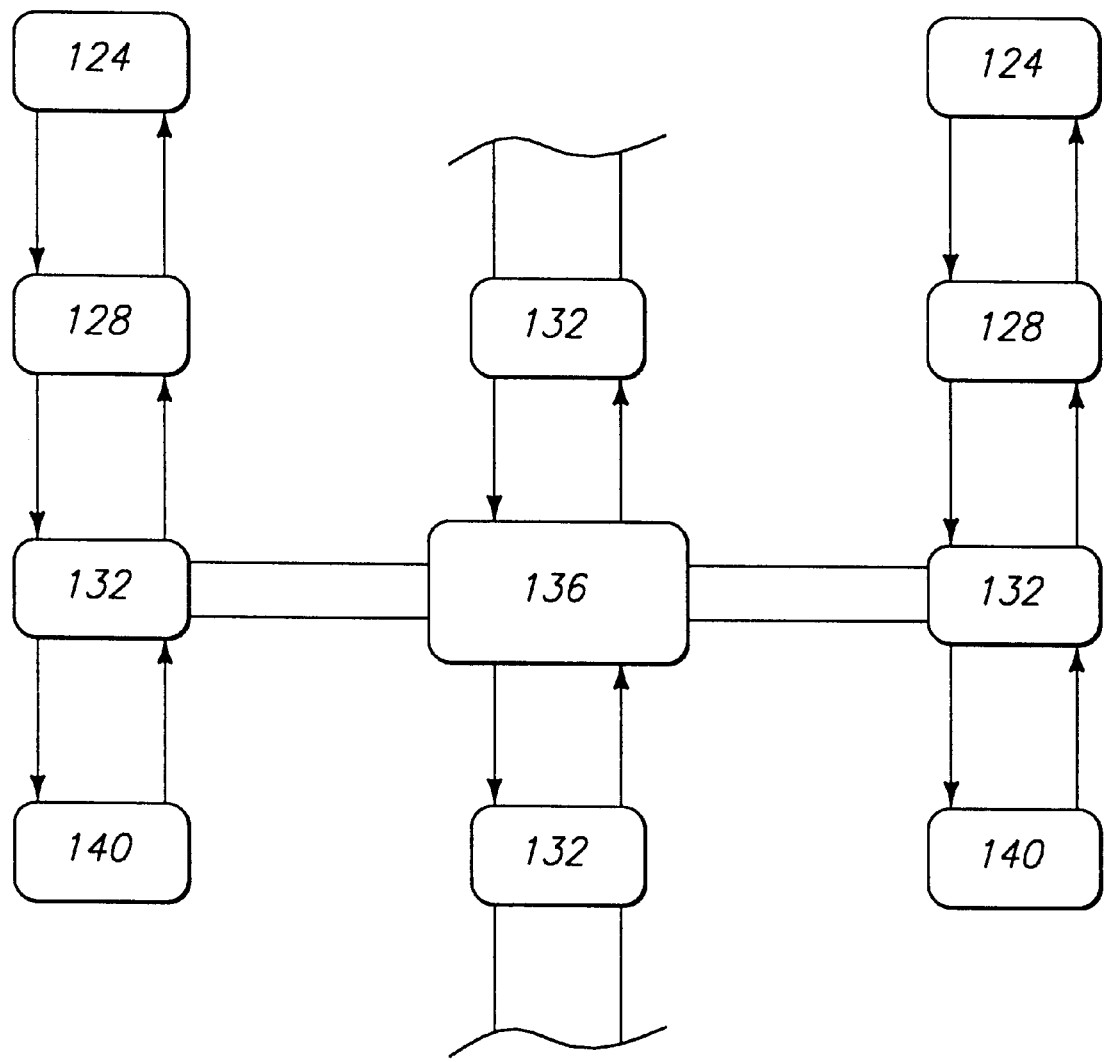
FIG. 9 is a schematic diagram illustrating a centralized roaming network according to the present invention.

FIG. 9 illustrates that a single server 136 can be utilized by a plurality of the servers 132. In this situation, each of the servers 132 represents a different local ISP. This situation illustrates the main advantage of using the server 136. As new home ISP's agree to accept authentication requests from local ISP's, each of the servers 132 do not need to be updated with new information, such as address information for the new home ISP's, address changes, shared key changes, port changes etc. Rather, only the server 136 needs to update its configuration file with the new information.

Referring to FIGS. 5 and 7, the ability to link the server 136 with the server 138 is referred to as a distributed roaming network. A distributed roaming network allows the server 138 to act as a gateway from one network to another, and allows a system administrator to easily manage the upkeep of the authentication list for the server 136. In a distributed environment, if the server 136 cannot find a match in its server table, it resends the inquiry to the server 138. Similarly, the server 138 can resend the inquiry to another server and this process can be repeated a number of times. The server queries are cached on each server, improving the speed for repeated queries. The cache is sustained only until a server table entry is updated or deleted. This results in a message to all neighboring servers to delete their caches.

Referring to FIGS. 5–9, the overall flow of information in the system 120 can now be discussed. The user 144 uses the dialer 124 to connect to a local internet service provider (local ISP) and transmits a user identifier plus a home ISP identifier plus a password to the server 132. For example, an acceptable logon format might be of the form username@userdomain plus a password. Typically, the password will be in a UNIX password file or in a third party's security server, such as Kerberos. Also, the password is typically encrypted (MD5) when sent from the server 132 to the server 140. An encryption key is shared between the servers 132, 136 and 140.

The server 132 sends an inquiry to the server 136 to see if the server 136 has a listing for the particular userdomain information in question. Normally, the server 136 will only have such a listing if the local ISP and the home ISP have agreed that the local ISP can provide internet access to customers of the home ISP.

If the server 136 finds an entry for the home ISP, the server 136 sends the server 132 the internet protocol (IP) address, port number and authentication type for the home ISP. With this information, the server 132 can make an internet connection with the server 140 of the home ISP and sends an authentication request to the server 140 that includes the username and password that the user 144 used when logging on to the system 120. The server 140 then verifies that the user 144 is a valid user. This usually means that the user 144 has an account in good standing with the home ISP so that the home ISP will be able to bill the user 144 for her use of the internet via the system 120.

If the user 144 is a valid user, the server 140 sends a "permission granted" message back to the server 132. The server 132 then notifies the server 128 to grant the user 144 a temporary IP address from its IP address pool. If the user 144 did not have a correct username or password, or if other negative factors are present, such as if the user 144 has a delinquent account, then the server 140 sends a rejection message to the server 132 and the server 128 will not grant the user 144 access to the internet.

The server 136 comprises a central routing server and a central accounting server.

The central accounting server collects accounting data and can send the accounting data to a database in real time or store it in a file and process it at intervals.

The central routing server maintains and manages all ISP authentication server information. Adding, deleting or updating ISP authentication server information (e.g. adding a new member ISP) requires only the modification of a configuration file on the server 136. The advantage of keeping all of the ISP authentication server information on a centralized server is that it prevents the configuration files on all of the servers 132 from having to be modified every time a new ISP member is added.

The configuration files for the server 136 include a central authentication server information table and a shared key file. The shared key file is used by both the server 136 and the server 140 to encrypt/decrypt the user's password. The central authentication server information table lists the domain names and/or dotted decimal notations for the home server (i.e. the server 140) as well as the port number, the type and the time difference between the location of the server 132 and the location of the server 140. Type refers to the authentication method used by the server 140 (e.g. RADIUS type). If the central authentication server information table or the shared key file are updated, the changes are dynamically rewritten to memory, so the server 136 does not need to be restarted.

Referring to the server 132, the function of this server is to receive authentication requests from the server 128. If the authentication request comes from a regular customer login (i.e. a customer who has an account with the local ISP), then normal user id and password authentication is performed as is well-known in the prior art. If the user requesting authentication is a "roamer" (i.e. a customer who does not have an account with the local ISP), the roamer transmits identifying information to the server 128 in the form of username@userdomain plus a password. The server 132 detects that this is a roamer because of the @ character, and sends a query to the closest routing server 136. The server 136 processes the query, as explained previously with respect to FIGS. 6–8, and sends the results of its search back to the server 132. If the results include identification of a home ISP server (i.e. the server 140), then the server 132 transmits an authentication request to the server 140 for verification of the user id (username) and password.

The server 132 also receives accounting data from the server 128. If the data is for a regular customer login, the data is written to the Local ISP log file on the server 132. If the data is for a roamer, the data is written to the Home ISP log file on the server 132 and on a log file in the server 136 and in the server 140.

Typically, the server 132 includes at least two types of configuration files, a host configuration file and a client configuration file. The host file lists information that allows the server 132 to locate the server 136, such as the IP address for the server 136 and the port for the server 136. The shared key for the server 136 is also listed. Note that this organizational scheme permits more than one routing server 136 (e.g. the server 138). The multiple routing servers can be designated as primary, secondary etc. in order to prioritize the order in which the server 132 attempts to contact the routing servers.

The client file includes information that allows the server 132 to check the ID of the server 140 or vice versa. The appropriate shared key for communicating with the server 140 is also listed in the client file. All of the routing servers listed in the host file must be listed in the client file.

Any configuration file changes are dynamically rewritten to memory so that the server 132 does not need to be restarted if the router information has been changed in the host file. The identification information for the server 140 that the server 132 gets from the server 136 (i.e. IP address, port, shared key and server type), will be cached if the server 132 has been started in cache on mode. Therefore, if the same domain name is queried again, the server 132 does not need to query the server 136 again. The local cache is cleaned when the server 132 receives an update message from the server 136 or from a systems manager.

In an alternative embodiment, the server 132 can be used as a point-to-point roaming server (i.e. the server 132 communicates directly with the server 140). In this situation the server 132 knows the address of the server 140 and therefore does not need to use the routing server 136. Therefore, in the point-to-point usage, the identification information for the server 136 does not need to be written in the host file of the server 132.

Although the present invention has been described in terms of the presently preferred embodiment, it is to be understood that such disclosure is not to be interpreted as limiting. Various alterations and modifications will no doubt become apparent to those skilled in the art after having read the above disclosure.

CLAIMS

What is claimed is:

1. A method for authorizing access to the internet comprising:

receiving a login information packet at a first server from a user, the login information packet including user identification information that is used to identify the user and home server identification information that is used to determine an internet address for a second server that uses the user identification information to identify the user;

determining that the login information packet includes the home server identification information;

searching a first list stored on the first server for the home server identification information;

obtaining an internet address for the second server if the home server identification information is found on the first list;

establishing an internet connection between the first server and the second server using the internet address for the second server obtained from the first list;

searching a second list stored on the second server for the user identification information;

transmitting an authorization message from the second server to the first server if the user identification information satisfies certain predetermined criteria; and granting the user access to the internet in response to the authorization message.

2. The method of claim 1 wherein the server identification information is separated from the user identification information by the @ symbol.

3. The method of claim 1 wherein the server identification information comprises a second level domain name separated from a first level domain name by a period.

4. A method for authorizing access to the internet comprising:

receiving a login information packet at a first server from a user, the login information packet including user identification information that is used to identify the user and server identification information that is used to determine an internet address for a second server that uses the user identification information to identify the user;

transmitting the server identification information from the first server to a third server;

searching a first list stored on the third server for the server identification information;

if the server identification information is found on the first list, transmitting the internet address for the second server from the third server to the first server, the internet address for the second server being obtained from the third server using the server identification information;

transmitting the user identification information from the first server to the second server over the internet using the internet address for the second server obtained from the third server;

searching a second list stored on the second server for the user identification information;

transmitting an authorization message from the second server to the first server over the internet if the user identification information is located on the second list and if the user satisfies certain predetermined criteria; and granting the user access to the internet after the authorization message is received at the first server.

5. The method of claim 4 wherein the server identification information is separated from the user identification information by the @ symbol in the login information packet.

6. The method of claim 4 wherein the server identification information comprises a second level domain name separated from a first level domain name by a period.

7. The method of claim 4 wherein the step of searching the first list stored on the third server for the server identification information includes a comparison of the last character in the server identification information to the last character of an entry in the first list followed by a comparison of the second to last character in the server identification information to the second to last character of the entry in the first list.

8. The method of claim 4 wherein the first list comprises a configuration file that includes an identifier for the second server, a port for the second server and a type for the second server.

9. The method of claim 4 wherein the first list includes a configuration file that lists a shared key that is used by the second server to decrypt a user password sent to the second server.

10. The method of claim 8 wherein the identifier comprises the network ID for the second server.

11. A method for authorizing access to the internet comprising:

receiving a login information packet at a first server from a user, the login information packet including user identification information that is used to identify the user and server identification information that is used to determine an internet address for a second server that uses the user identification information to identify the user;

transmitting the server identification information from the first server to a third server;

searching a first list stored on the third server for the server identification information;

if the server identification information is not found on the first list, transmitting the server identification information to a fourth server;

searching a second list stored on the fourth server for the server identification information;

if the server identification information is found on the second list, transmitting the internet address for the second server from the fourth server to the first server, the internet address for the second server being obtained from the fourth server using the server identification information;

transmitting the user identification information from the first server to the second server over the internet using the internet address for the second server obtained from the fourth server;

searching a third list stored on the second server for the user identification information;

transmitting an authorization message from the second server to the first server over the internet if the user identification information is located on the third list and if the user satisfies certain predetermined criteria; and granting the user access to the internet after the authorization message is received at the first server.

12. The method of claim 11 wherein the server identification information is separated from the user identification information by the @ symbol in the login information packet.

13. The method of claim 11 wherein the server identification information comprises a second level domain name separated from a first level domain name by a period.

14. The method of claim 11 wherein the step of searching the second list stored on the fourth server for the server identification information includes a comparison of the last character in the server identification information to the last character of an entry in the second list followed by a comparison of the second to last character in the server identification information to the second to last character of the entry in the second list.

15. The method of claim 11 wherein the second list comprises a configuration file that includes an identifier for the second server, a port for the second server and a type for the second server.

16. The method of claim 11 wherein the second list includes a configuration file that lists a shared key that is used by the second server to decrypt a user password sent to the second server.

17. The method of claim 15 wherein the identifier comprises a network ID for the second server.

18. An apparatus for authorizing access to the internet comprising:

a first server for receiving a login information packet from a user, the login information packet including user identification information that is used to identify the user and server identification information that is used to determine an internet address for a second server that uses the user identification information to identify the user;

a third server adapted to receive the server identification information from the first server;

software means running on the third server for verifying that the server identification information is listed in a table stored on the third server and for transmitting the internet address for the second server from the third server to the first server, the internet address for the second server being obtained from the table using the server identification information;

routing means for transmitting the user identification information from the first server to the second server over the internet using the internet address for the second server obtained from the table;

authentication means running on the second server for verifying that the user identification information satisfies certain predetermined criteria; and authorization means for transmitting a message from the second server to the first server instructing that the user be granted access to the internet.

* * * * *